United States Patent

Teeg et al.

[15] 3,642,432

[45] *Feb. 15, 1972

[54] PROCESSES FOR OBTAINING VANADIUM SUBOXIDES

[72] Inventors: Robert O. Teeg, Grosse Pointe; Robert W. Hallman, Utica, both of Mich.

[73] Assignee: Teeg Research, Inc., Detroit, Mich.

[ * ] Notice: The portion of the term of this patent subsequent to July 15, 1986, has been disclaimed.

[22] Filed: Nov. 21, 1969

[21] Appl. No.: 878,881

Related U.S. Application Data

[63] Continuation-in-part of Ser. No. 447,546, Apr. 12, 1965, which is a continuation-in-part of Ser. No. 358,065, Apr. 7, 1964, Pat. No. 3,455,724.

[52] U.S. Cl. ................................23/19 V, 23/21, 23/140
[51] Int. Cl. ................................C22b 59/00, C01g 31/00
[58] Field of Search ...................23/19.1, 16, 21, 140, 204

[56] References Cited

UNITED STATES PATENTS

| | | | |
|---|---|---|---|
| 2,441,447 | 5/1948 | Seabright | 23/19.1 |
| 2,871,100 | 1/1959 | Guire et al. | 23/50 X |
| 3,378,350 | 4/1968 | Sasaki | 23/140 X |

OTHER PUBLICATIONS

Kosuge et al—"Journal of the Physical Society of Japan", Vol. 18, 1963, pp. 318–319.

Mellor, "A Comprehensive Treatise on Inorganic & Theoretical Chemistry", Vol. 9, New Impression, Sept. 1949, pp. 743–744.

Sasaki et al., "Journal of the Physical Soc. of Japan", Vol. 19, Sept. 1964, p. 1748.

*Primary Examiner*—Herbert T. Carter
*Attorney*—Hauke, Gifford and Patalidis

[57] ABSTRACT

Method for obtaining vanadium suboxide of the general formula $VO_x$, wherein $x$ is comprised between 1.5 and 2.02, and preferably between 1.88 and 2.02, consisting in heating vanadium pentoxide, contained in an inert boat, in a reduced atmosphere in the presence of a stoichiometric amount of vanadium sesquioxide, and recovering the vanadium suboxide in a bulk or crystalline form remaining in the boat.

4 Claims, No Drawings

PROCESSES FOR OBTAINING VANADIUM SUBOXIDES

CROSS REFERENCE TO RELATED APPLICATIONS

The present application is a continuation-in-part application of copending application Ser. No. 447,546, filed Apr. 12, 1965, which is a continuation-in-part of application Ser. No. 358,065, filed Apr. 7, 1964, now U.S. Pat. No. 3,455,724, issued July 15, 1969.

BACKGROUND OF THE INVENTION

I. Field of the Invention

The invention relates to vanadium suboxides and to processes for obtaining vanadium suboxides in bulk form as well as in single crystal form.

II. Description of the Prior Art

In U.S. Pat. No. 3,455,724 are disclosed processes for the preparation of vanadium suboxide thin films which comprise evaporating vanadium pentoxide ($V_2O_5$) at a temperature in the range of 500° to 850° C. under a reduced pressure, generally of the order of $10^{-4}$ mm. Hg to $10^{-6}$ mm. Hg, condensing thin films of such vanadium pentoxide upon a substrate and subsequently heating the substrate at a temperature in the range of 400° to 600° C. under a reduced pressure in the range of $10^{-1}$ mm. Hg to $10^{-4}$ mm. Hg in the presence of a reaction medium which may consist of an appropriate stoichiometric amount of vanadium sesquioxide ($V_2O_3$), or in the presence of a reaction medium consisting of a metal and/or metal oxide having greater affinity for oxygen than vanadium pentoxide, or more simply yet in reducing the vanadium pentoxide by simply heating under reduced pressure or in a controlled atmosphere containing oxygen at a pressure at most equal to the equilibrium vapor pressure of oxygen above the desired vanadium suboxide at the reaction temperature.

It has now also been found that it is possible to obtain not only vanadium suboxide thin film according to the processes disclosed in the patent, but also vanadium suboxide in a bulk form, such as powder or pellets, may be obtained according to said processes.

SUMMARY OF THE INVENTION

Vanadium suboxide, in the parent application, now U.S. Pat. No. 3,455,724, as well as in the present application, designates materials of the general formula $VO_x$ wherein $x$ is a number comprised generally between 1.50 and 2.02. Thin films made of vanadium suboxide having found applications in thermistors, temperature detectors, infrared detectors and imaging devices, and the like. Although it is generally desirable to obtain vanadium suboxide in the form of thin films for such applications, it is also desirable for some applications to obtain vanadium suboxide in a bulk form, such as powder or pellets, or in a crystalline form such as single crystals.

The method of the present invention for obtaining vanadium suboxide includes placing vanadium pentoxide in a reduced atmosphere in the presence of a stoichiometric amount of vanadium sesquioxide, heating the vanadium pentoxide for a period of time from a few minutes to several hours, and recovering the vanadium suboxide.

DESCRIPTION OF THE PREFERRED EMBODIMENT

In order to prepare bulk vanadium suboxide according to the invention, vanadium pentoxide powder, or a vanadium pentoxide pellet which may be as thick as 10 mm. or more and which has been prepared from vanadium pentoxide, with or without sintering, is placed in a bell jar or closed container. The bell jar is preferably a high silica glass ampul provided with means for evacuating the atmosphere to a reduced pressure in the order of $10^{-1}$ mm. Hg to $10^{-4}$ mm. Hg. In order to control the oxygen pressure over the sample being prepared a "getter" consisting of a boat containing, for example, vanadium sesquioxide is disposed proximate to the boat containing the vanadium pentoxide powder or pellet. It will, however, be appreciated that other convenient means for controlling oxygen pressure may be used to achieve comparable results.

The atmosphere of the bell jar is evacuated to a pressure of $10^{-1}$ to $10^{-4}$ mm. Hg, but preferably to a pressure of $10^{-2}$ mm. Hg. The boats containing respectively the vanadium pentoxide and the "getter" are heated to a temperature in the range of 400° to 600° C., preferably between 450° and 550° C., and maintained at that temperature for sufficient time to completely reduce the vanadium pentoxide to a vanadium suboxide such as vanadium dioxide having a formula substantially such as $VO_2$.

If the "getter" consists of an appropriate stoichiometric amount of vanadium sesquioxide, no special precaution in timing of the operation is required as the final vapor pressure of both the vanadium pentoxide being reduced and of the "getter" are equal, since the vanadium pentoxide is reduced to vanadium suboxide and the vanadium sesquioxide is oxidized to vanadium suboxide. According to the amount and particle size of the vanadium pentoxide powder, or according to the thickness of the pallet of vanadium pentoxide, the complete reduction of the vanadium pentoxide to vanadium suboxide takes from a few minutes to several hours under the conditions as above indicated. If an excess of "getter" is used, the time required for reduction of the vanadium pentoxide is decreased, but the timing of the operation becomes critical.

In order to prepare vanadium suboxide in signal crystal form, vanadium pentoxide is placed in a boat, preferably made of platinum or made of tantalum lined with platinum. The boat containing the vanadium pentoxide and a second boat containing preferably a stoichiometric amount of vanadium sesquioxide are placed in a bell jar and the jar atmosphere is evacuated to a pressure of $10^{-4}$ to $10^{-6}$ mm. Hg. The boats containing respectively the vanadium pentoxide and the vanadium sesquioxide are heated to a temperature of 500° to 850° C. at such pressure and, preferably, to a temperature of 650° to 700° C. at a pressure of substantially $10^{-5}$ mm. Hg. Vanadium pentoxide is continuously evaporated from the boat in the presence of vanadium sesquioxide, until all the vanadium pentoxide has been entirely evaporated from the boat and only a blue-black needlelike crystalline residue remains adhering to the walls of the boat. The vanadium sesquioxide contained in the second boat is oxidized to vanadium suboxide. The blue-black crystalline residue thus obtained in the first boat consists of individual prismatic needles approximately 8 mm. long, 0.5 mm. wide and 0.2 mm. thin. X-ray examination of the residue, using the Laue back reflection technique, reveals diffraction zones consistent with a single crystal structure. Resistivity measurements effected on the crystals as a function of temperature reveal an abrupt decrease of resistivity at about 65° C. of three to five orders of magnitude for an increase in temperature of 0.5° C., which is typical of the behavior of vanadium suboxides of the general formula $VO_x$, wherein $x$ is a number approximately equal to 2, but the exact limits of which are not precisely known at the present although they seem to be comprised between about 1.88 and about 2.02.

Having thus described the invention, what is claimed as being new and desired to be secured by Letters Patent is:

1. Process for the preparation of vanadium dioxide having the formula $VO_x$ wherein $x$ is comprised between 1.88 and 2.02 which comprises heating vanadium pentoxide in an inert boat in a bell jar at a temperature in the range of 400° to 600° C. under a pressure in the range of $10^{-1}$ mm. Hg to $10^{-4}$ mm. Hg in the presence of a separate second boat containing a reaction medium consisting of an appropriate stoichiometric amount of vanadium sesquioxide heated at a temperature in the range of 400° to 600° C., and recovering said vanadium dioxide remaining in both said boats in a bulk form.

2. The process as defined in claim 1, wherein the temperatures are in the range of 450° to 550° C. and the pressure is substantially $10^{-2}$ mm. Hg.

3. Process for the preparation of vanadium dioxide of the formula $VO_x$ wherein $x$ is comprised between 1.88 and 2.02 comprising evaporating vanadium pentoxide in an inert boat in a bell jar at a temperature in the range of 500° to 850° C. under a pressure in the range of $10^{-4}$ mm. Hg to $10^{-6}$ mm. Hg in the presence of separate second boat containing a reaction medium consisting of an appropriate stoichiometric amount of vanadium sesquioxide heated at said temperature in the range of 500° to 850° C. until all vanadium pentoxide is evaporated leaving a crystalline residue of vanadium dioxide in said first boat, and recovering said residue remaining in said first boat.

4. The process as defined in claim 3, wherein the temperatures are in the range of 650° to 700° C. and the pressure is substantially $10^{-5}$ mm. Hg.

* * * * *